(12) United States Patent
Chen et al.

(10) Patent No.: US 12,353,045 B2
(45) Date of Patent: Jul. 8, 2025

(54) OPTICAL ELEMENT DRIVING MECHANISM

(71) Applicant: TDK TAIWAN CORP., Taoyuan (TW)

(72) Inventors: Shu-Shan Chen, Taoyuan (TW);
Pai-Jui Cheng, Taoyuan (TW);
Chieh-An Chang, Taoyuan (TW);
Hsiao-Hsin Hu, Taoyuan (TW);
Chao-Chang Hu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 651 days.

(21) Appl. No.: 17/705,600

(22) Filed: Mar. 28, 2022

(65) Prior Publication Data
US 2022/0308357 A1 Sep. 29, 2022

Related U.S. Application Data

(60) Provisional application No. 63/167,300, filed on Mar. 29, 2021.

(51) Int. Cl.
| | | |
|---|---|---|
| G02B 7/04 | (2021.01) | |
| G02B 7/08 | (2021.01) | |
| G02B 27/64 | (2006.01) | |
| G03B 3/10 | (2021.01) | |
| G03B 5/00 | (2021.01) | |
| G03B 11/04 | (2021.01) | |
| H01F 7/02 | (2006.01) | |
| H01F 7/08 | (2006.01) | |

(52) U.S. Cl.
CPC .................. *G02B 7/08* (2013.01); *G02B 7/04* (2013.01); *G02B 27/646* (2013.01); *G03B 3/10* (2013.01); *G03B 5/00* (2013.01); *G03B 11/043* (2013.01); *H01F 7/02* (2013.01); *H01F 7/081* (2013.01); *G03B 2205/0007* (2013.01); *G03B 2205/0053* (2013.01)

(58) Field of Classification Search
CPC ..................................... G02B 7/04; G02B 7/09
See application file for complete search history.

(56) References Cited

U.S. PATENT DOCUMENTS

2016/0161828 A1* 6/2016 Lee .......................... G02B 7/04
359/824

* cited by examiner

*Primary Examiner* — Joseph P Martinez
(74) *Attorney, Agent, or Firm* — MUNCY, GEISSLER, OLDS & LOWE, P.C.

(57) ABSTRACT

An optical element driving mechanism is provided. The optical element driving mechanism includes a fixed portion, a movable portion, a driving assembly, and a first weighting element. The movable portion is arranged with the fixed portion in a main axis, and the movable portion is movable relative to the fixed portion. The driving assembly is used for driving the movable portion to move relative to the fixed portion. The first weighting element is disposed on the driving assembly for stabilizing the driving assembly.

20 Claims, 17 Drawing Sheets

OPTICAL ELEMENT DRIVING MECHANISM

CROSS REFERENCE TO RELATED APPLICATIONS

This application claims the benefit of U.S. Provisional Application No. 63/167,300, filed on Mar. 29, 2021, the entirety of which is incorporated by reference herein.

BACKGROUND OF THE INVENTION

Field of the Invention

The present disclosure relates to an optical element driving mechanism.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choice to consumers.

Electronic devices that have image-capturing or video-recording functions normally include an optical element driving mechanism to drive an optical element (such as a lens) to move along its optical axis, thereby achieving auto focus (AF) or optical image stabilization (OIS). Light may pass through the optical element and may form an image on an optical sensor. However, the trend in modern mobile devices is to have a smaller size and a higher durability. As a result, how to effectively reduce the size of the optical element driving mechanism and how to increase its durability has become an important issue.

BRIEF SUMMARY OF THE INVENTION

An optical element driving mechanism is provided in some embodiments. The optical element driving mechanism includes a fixed portion, a movable portion, a driving assembly, and a first weighting element. The movable portion is arranged with the fixed portion in a main axis, and the movable portion is movable relative to the fixed portion. The driving assembly is used for driving the movable portion to move relative to the fixed portion. The first weighting element is disposed on the driving assembly for stabilizing the driving assembly.

In some embodiments, the fixed portion includes a case and a bottom arranged with the case along the main axis. The bottom includes a first main body connecting to the case, and a first extending portion extending from the first main body along the main axis.

In some embodiments, the first extending portion includes a first extending unit and a second extending unit. The first extending unit is plate-shaped. The second extending unit is plate-shaped. A first recess is formed on the first extending unit. A second recess is formed on the second extending unit. The first weighting element includes a first weighting unit, a first weighting connecting portion, and a second weighting connecting portion. The first weighting connecting portion extends from the first weighting unit in a first direction. The second weighting connecting portion extends from the first weighting unit in a second direction. The first direction and the second direction are different.

In some embodiments, the first weighting connecting portion is disposed in the first recess. The second weighting connecting portion is disposed in the second recess. A normal vector of the first extending unit is parallel to the first direction. A normal vector of the second extending unit is parallel to the second direction. When viewed along the first direction, the first weighting connecting portion does not overlap the second weighting connecting portion. When viewed along the second direction, the first weighting connecting portion does not overlap the second weighting connecting portion.

In some embodiments, the driving assembly includes a driving element, a second weighting element connecting to the driving element, and a transmission element connecting to the driving element and is strip-shaped. The second weighting element is disposed on the first weighting element. The density of the first weighting element is different from the density of the second weighting element. The material of the first weighting element is different from the material of the bottom. The material of the second weighting element is different from the material of the bottom. The density of the first weighting element is greater than the density of the bottom. The density of the second weighting element is greater than the density of the bottom.

In some embodiments, the first weighting element and the transmission element are disposed on opposite sides of the driving element. The second weighting element and the transmission element are disposed on opposite sides of the driving element. The bottom further includes a first concave portion concaving from the first main body. The bottom is polygonal when viewed along the main axis. The first concave portion is position at a corner of the bottom. The thickness of the first concave portion is less than the thickness of the first main body.

In some embodiments, a space is formed between the first extending portion, the first weighting element, and the first concave portion. The driving assembly is partially disposed in the space. A first opening is formed on the first main body. A second opening is formed on the first concave portion. The transmission element is spaced apart from the first opening. The transmission element passes through the second opening.

In some embodiments, the movable portion includes a second main body and a disposing portion. When viewed along the main axis, the movable portion is polygonal. The disposing portion is at a corner of the movable portion. In some embodiments, at least a portion of the disposing portion overlaps the first concave portion in the direction that the main axis extends.

In some embodiments, the first main body includes a bottom surface. A distance between the second main body and the bottom surface is greater than a distance between the disposing portion and the bottom surface in the direction that the main axis extends. The second weighting element is disposed in the space. The driving element is disposed in the space. A portion of the transmission element is disposed in the space. A through hole and a second concave portion are formed on the disposing portion. The second concave portion is adjacent to the through hole.

In some embodiments, the optical element driving mechanism further includes a first buffer element disposed between the fixed portion and the transmission element, a second buffer element disposed between the fixed portion and the transmission element, a first resilient element disposed between the movable portion and the transmission element, a second resilient element disposed between the movable portion and the transmission element, and a guiding element disposed between the movable portion and the fixed portion and extending in the direction that the main axis extends, wherein the guiding element is used for limiting the moving direction of the movable portion relative to the fixed portion.

In some embodiments, the case includes a top wall, a side wall extending from the top wall in the direction that the main axis extends, and a case extending portion extending from the top wall in the direction that the main axis extends.

In some embodiments, the case extending portion surrounds the first buffer element. The first buffer element is disposed between the case extending portion and the transmission element. The second buffer element is disposed between the first concave portion and the transmission element. The second resilient element is disposed between the first resilient element and the transmission element. A portion of the second resilient element is exposed from the first resilient element.

In some embodiments, the first resilient element is disposed in the through hole. The second resilient element is disposed in the through hole. A portion of the second resilient element is disposed in the second concave portion. At least a portion of the first buffer element overlaps the second buffer element in a direction that the transmission element extends. At least a portion of the first resilient element overlaps the second resilient element in the direction that the transmission element extends.

In some embodiments, the bottom further includes a block wall disposed on the first main body. The block wall is plate-shaped. The block wall includes a first column and a second column extending in the first direction. The optical element driving mechanism further includes a circuit element disposed on the fixed portion. The circuit element includes a first circuit element opening and a second circuit element opening. The first column passes through the first circuit element opening. The second column passes through the second circuit element opening. The first circuit element opening and the second circuit element opening are arranged in a third direction. The third direction is parallel to the main axis.

In some embodiments, the second circuit element opening is strip-shaped and extends in the third direction. The size of the first circuit element opening is different from the size of the second circuit element opening in the third direction. The first circuit element opening and the second circuit element opening are formed away from the center of the circuit element. The optical element driving mechanism further includes a connecting element and a conductive element. The conductive element is disposed on the driving element and electrically connected to the driving element. In some embodiments, the conductive element connects to the connecting element and a connecting point of the circuit element.

In some embodiments, the side wall includes a side wall recess. The connecting point is exposed from the side wall recess when viewed along the first direction. The first circuit element opening and the second circuit element opening overlaps the side wall when viewed along the first direction.

In some embodiments, the optical element driving mechanism further includes a sensing assembly used for detecting the position of the movable portion relative to the fixed portion, wherein the sensing assembly includes a sensing element and a magnetic element respectively disposed on the fixed portion and the movable portion. At least a portion of the sensing element overlaps the magnetic element in the first direction. The movable portion moves relative to the fixed portion in the third direction. The first direction and the third direction are different. The block wall includes a third opening. The sensing element is disposed in the third opening.

In some embodiments, the magnetic element includes a first magnetic unit, a second magnetic unit arranged with the first magnetic unit in the third direction, and a magnetic-free region disposed between the first magnetic unit and the second magnetic unit. The first magnetic unit includes a first pole and a second pole arranged in the second direction. The second magnetic unit includes a third pole and a fourth pole arranged in the second direction. The polarity of the first pole is identical to the polarity of the third pole. The polarity of the second pole is identical to the polarity of the fourth pole. The sensing element is used for detecting the magnetic field variation of the magnetic element in the first direction, the second direction, and the third direction.

In some embodiments, the magnetic element includes a first magnetic unit, a second magnetic unit arranged with the first magnetic unit in the third direction, and a magnetic-free region disposed between the first magnetic unit and the second magnetic unit. The first magnetic unit includes a first pole and a second pole arranged in the first direction. The second magnetic unit includes a third pole and a fourth pole arranged in the first direction. The polarity of the first pole is identical to the polarity of the third pole. The polarity of the second pole is identical to the polarity of the fourth pole. The sensing element is used for detecting the magnetic field variation of the magnetic element in the third direction.

In some embodiments, the magnetic element includes a first pole and a second pole arranged in the third direction. The sensing element is used for detecting the magnetic field variation of the magnetic element in the third direction.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1A:
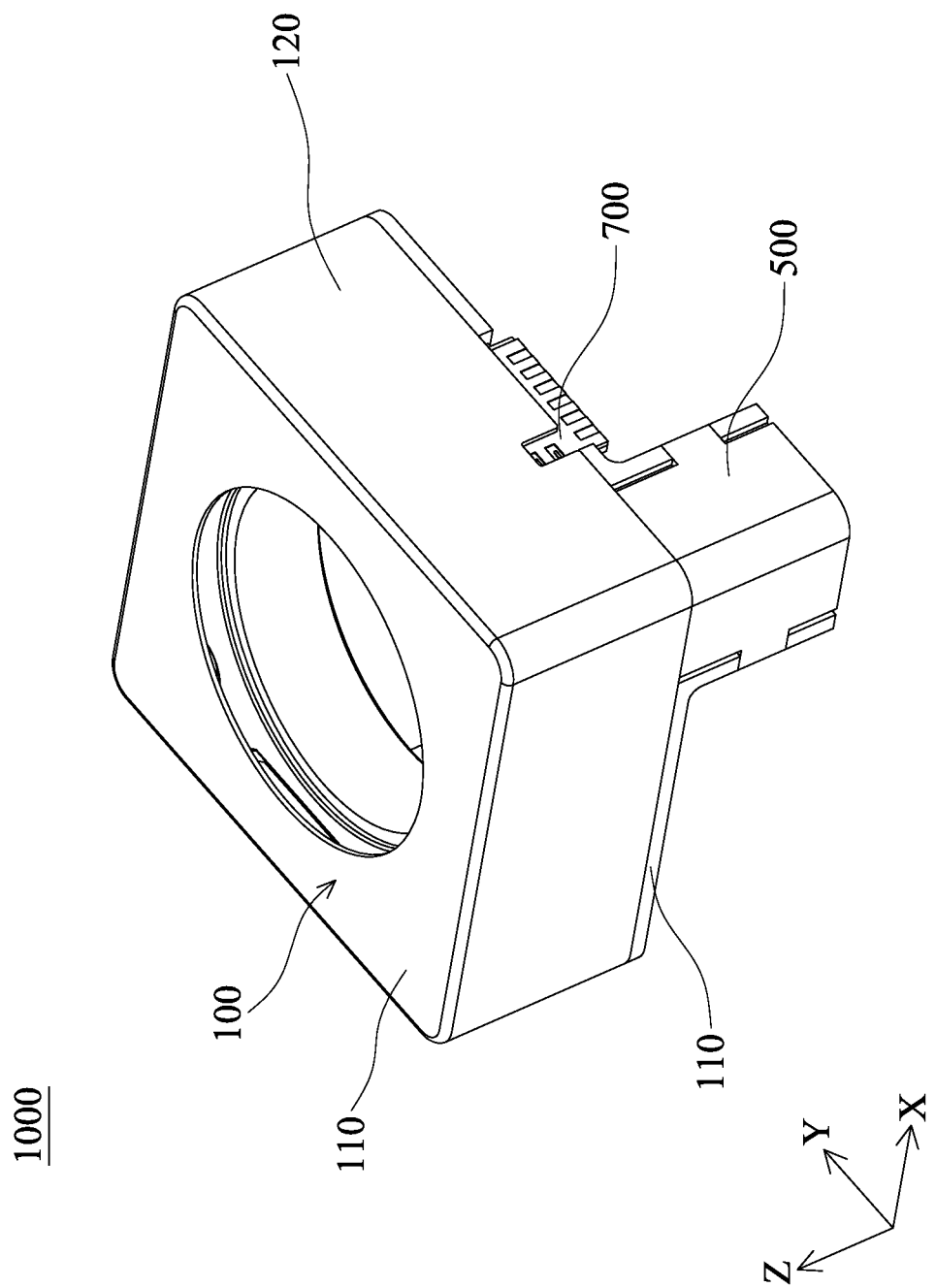
FIG. 1A is a schematic view of an optical element driving mechanism.

The following disclosure provides many different embodiments, or examples, for implementing different features of the provided subject matter. Specific examples of components and arrangements are described below to simplify the present disclosure. These are, of course, merely examples and are not intended to be limiting. For example, in some embodiments, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 1B:
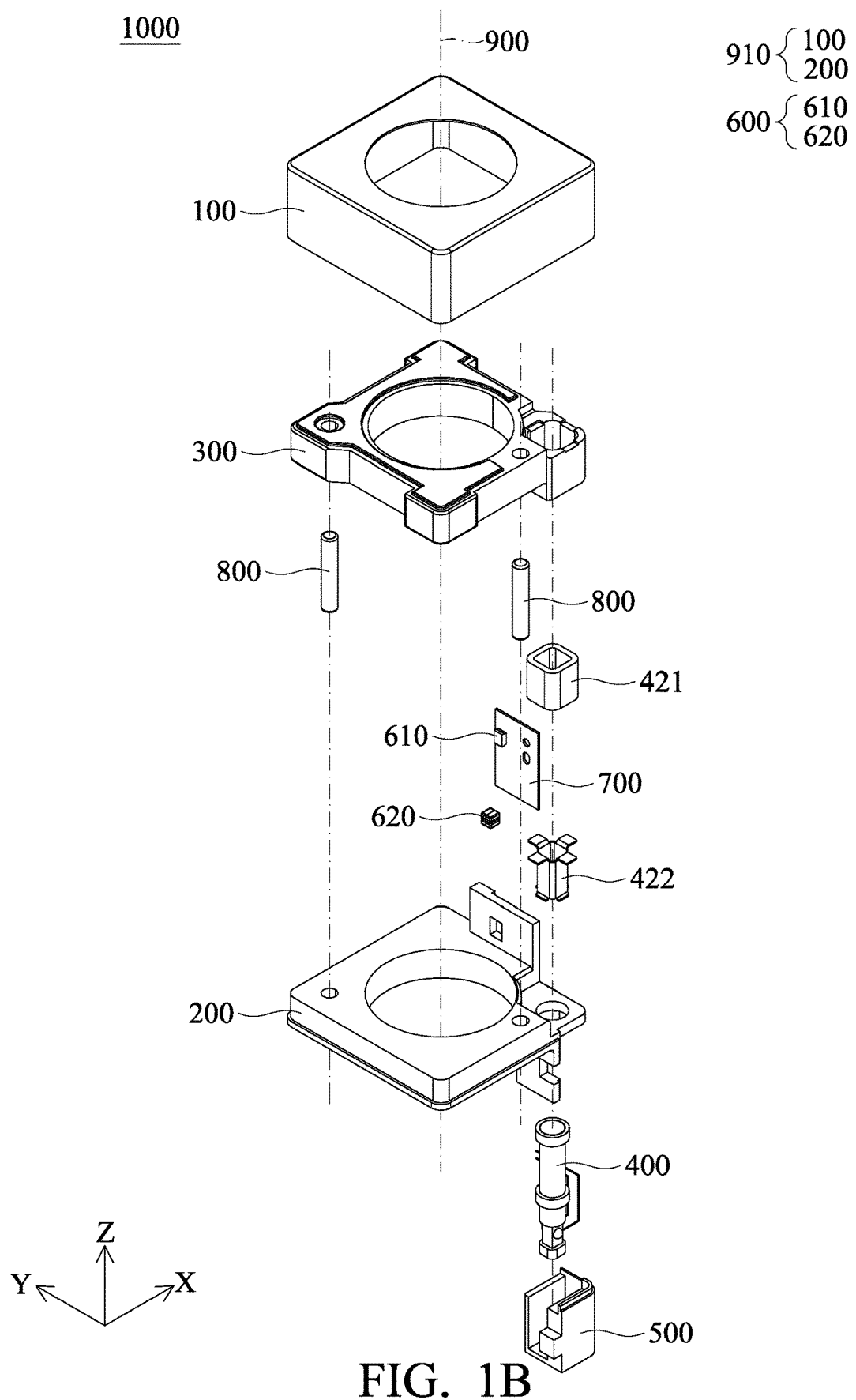
FIG. 1B is an exploded view of the optical element driving mechanism.
Figure 1C:
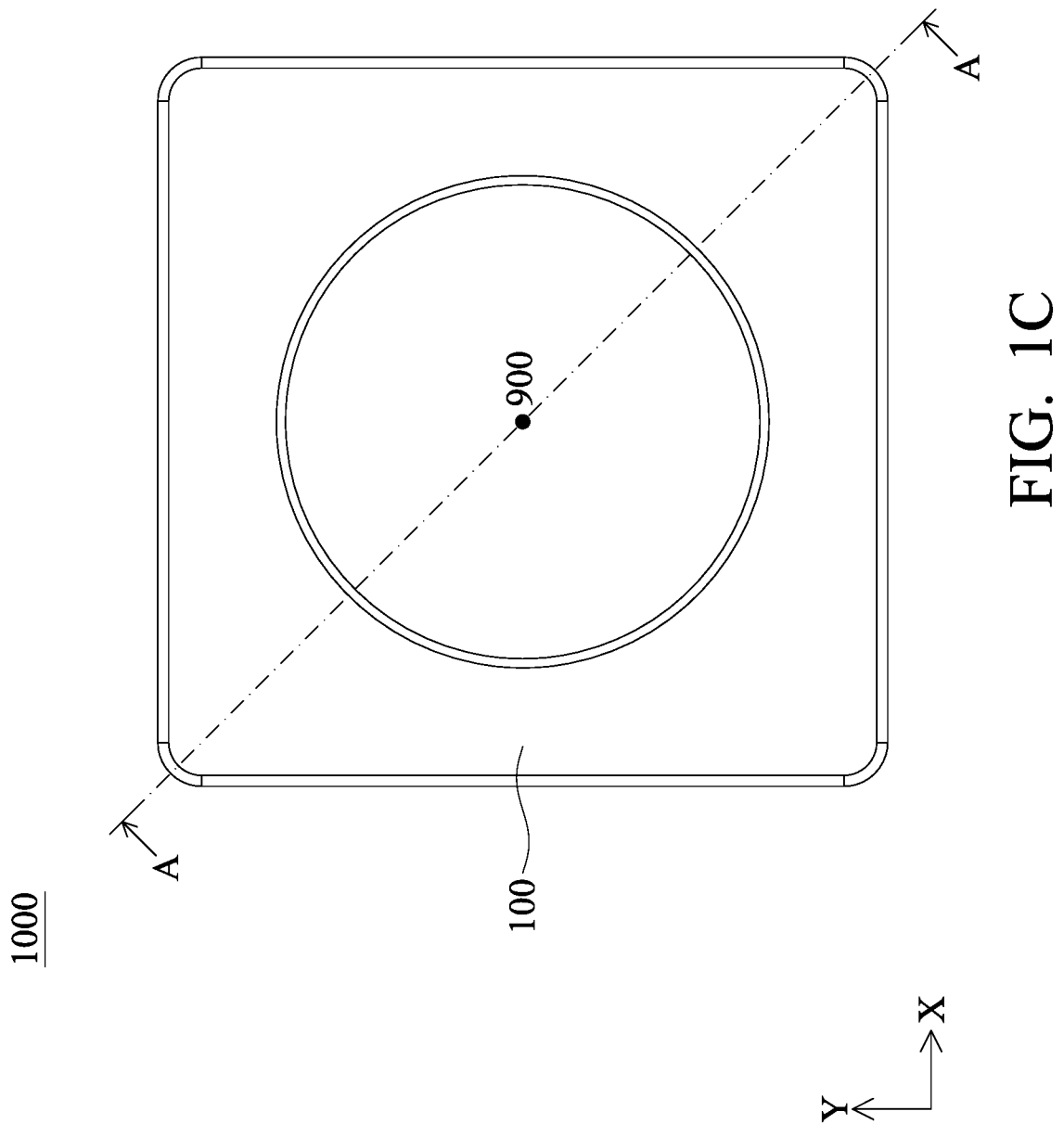
FIG. 1C is a top view of the optical element driving mechanism.
Figure 1D:
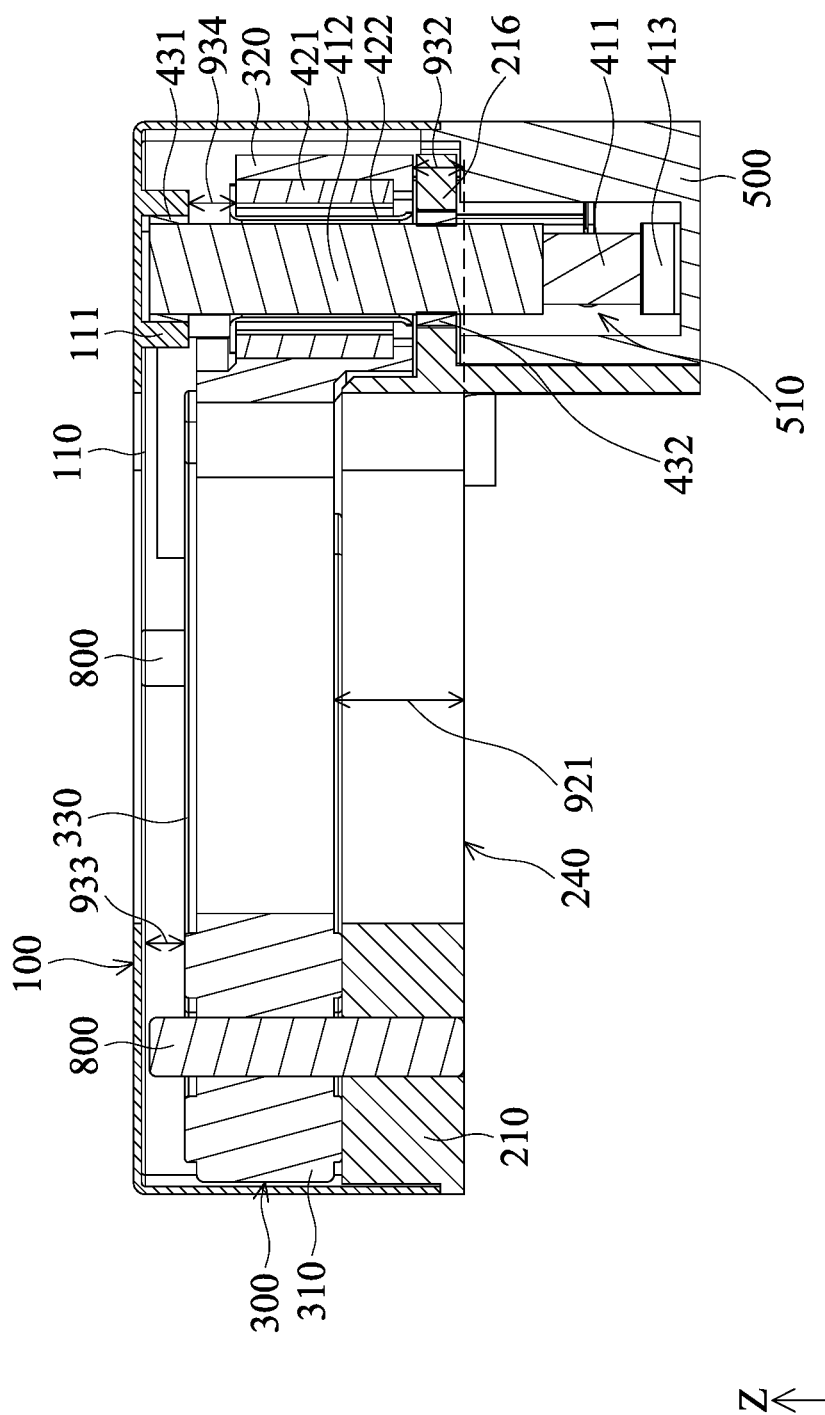
FIG. 1D is a cross-sectional view illustrated along the line A-A in FIG. 1C.
Figure 1E:
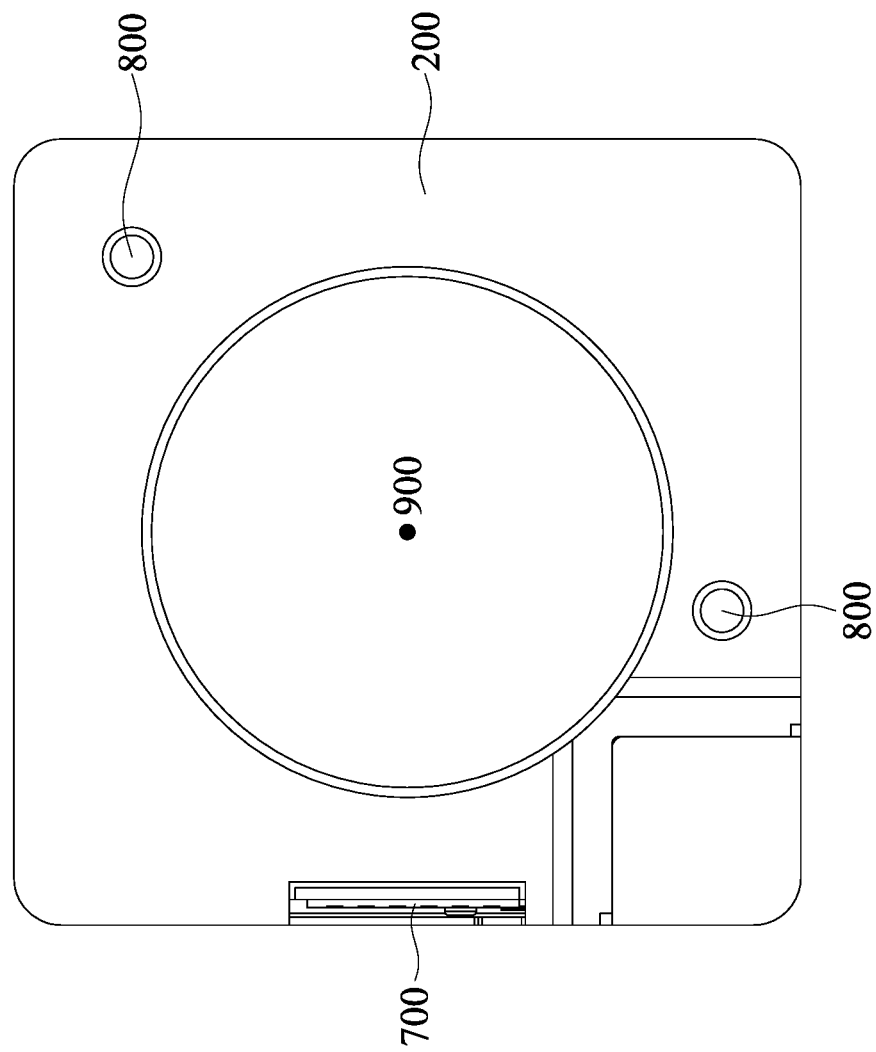
FIG. 1E is a bottom view of the optical element driving mechanism.

FIG. 1A is a schematic view of an optical element driving mechanism 1000. FIG. 1B is an exploded view of the optical element driving mechanism 1000. FIG. 1C is a top view of the optical element driving mechanism 1000. FIG. 1D is a cross-sectional view illustrated along the line A-A in FIG. 1C. FIG. 1E is a bottom view of the optical element driving mechanism 1000. As shown in FIG. 1A to FIG. 1E, the optical element driving mechanism 1000 may mainly include a case 100, a base 200, a movable portion 300, a driving assembly 400, a first resilient element 421, a second resilient element 422, a first weighting element 500, a sensing element 610, a magnetic element 620, a circuit element 700, and guiding element 800 arranged along a main axis 900.

In some embodiments, the case 100 and the base 200 may be called as a fixed portion 910, and the movable portion 300 may move relative to the fixed portion 910 along the main axis 900. In some embodiments, an optical element (not shown) may be disposed in the movable portion 300 to achieve auto focus (AF). The optical element may include a lens, a mirror, a prism, a beam splitter, an aperture, a liquid lens, an image sensor, a camera module, or a ranging module. It should be noted that the definition of the optical element is not limited to the element that is related to visible light, and other elements that relate to invisible light (e.g. infrared or ultraviolet) are also included in the present disclosure.

In some embodiments, the driving assembly 400 may be used for driving the movable portion 300 to move relative to the fixed portion 910. For example, the movable portion 300 may movably connected to the fixed portion 910 through the driving assembly 400 and the guiding element 800. In some embodiments, the sensing element 610 and the magnetic element 620 may be called as a sensing assembly 600 used for detecting the position of the movable portion 300 relative to the fixed portion 910. The sensing element 610 and the magnetic element 620 may be respectively disposed on the fixed portion 910 (e.g. the base 200) and the movable portion 300, or their positions may be interchanged, depending on design requirement. In some embodiments, the sensing element 610 may include a Hall sensor, a magnetoresistance effect sensor (MR sensor), a giant magnetoresistance effect sensor (GMR sensor), a tunneling magnetoresistance effect sensor (TMR sensor), or a fluxgate sensor, depending on design requirement.

In some embodiments, the guiding element 800 may extend in the direction that the main axis 900 extends (i.e. the Z direction) to define the moving direction of the movable portion 300 relative to the fixed portion 910. In some embodiments, two guiding element 800 may be provided to further define the moving direction of the movable portion 300 relative to the fixed portion 910. In some embodiments, the guiding element 800 may be exposed from the base 200, as shown in FIG. 1E.

Figure 2:
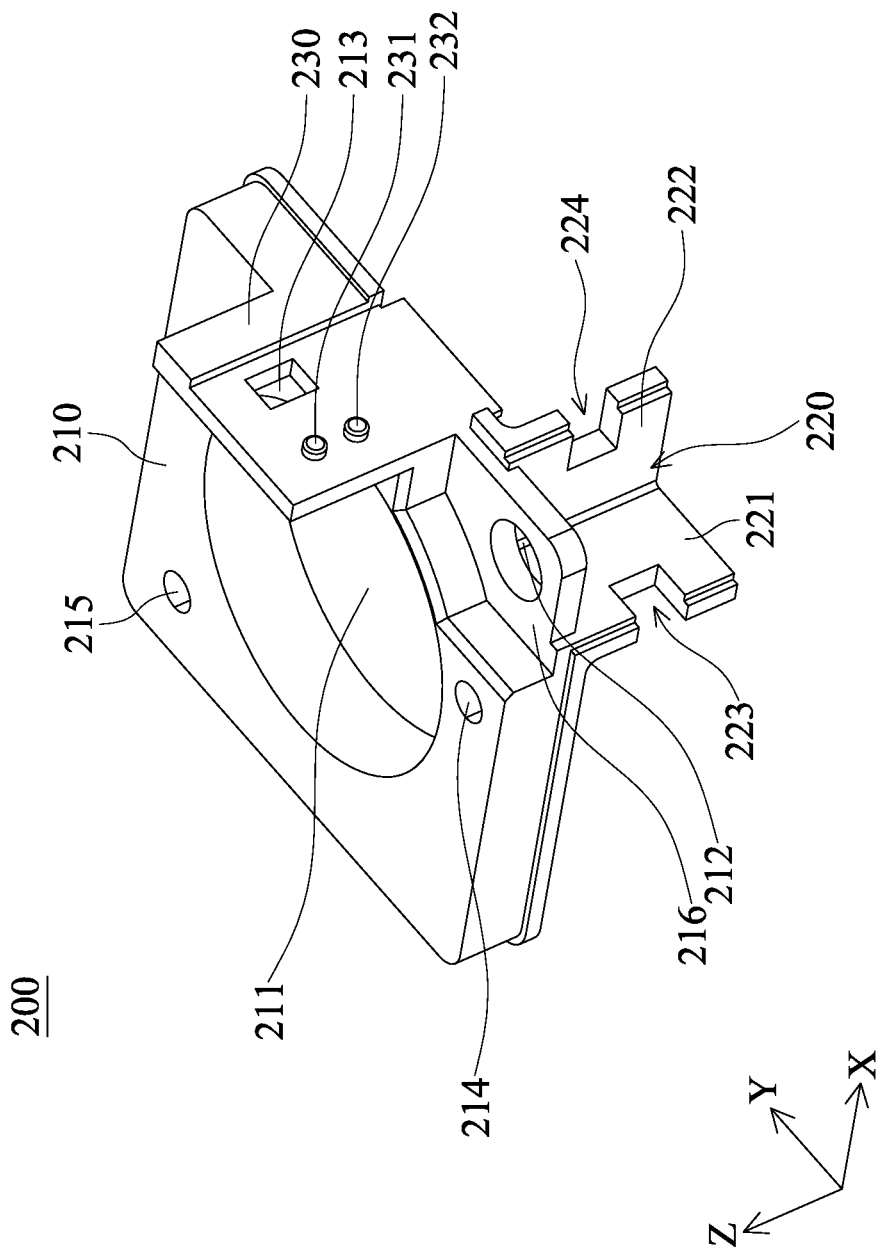
FIG. 2 is a schematic view of the base.

FIG. 2 is a schematic view of the base 200. As shown in FIG. 2, the base 200 may include a first main body 210 and a first extending portion 220 and a block wall 230 extending from the first main body 210 through the fixed portion 910. The first extending portion 220 may include a first extending unit 221 and a second extending unit 222 that are plate-shaped. In some embodiments, a first recess 223 may be formed on the first extending unit 221, and a second recess 224 may be formed on the second extending unit 222. In some embodiments, the normal direction of the first extending unit 221 may be parallel to a second direction (e.g. the Y direction), and the normal direction of the second extending unit 222 may be parallel to a first direction (e.g. the X direction).

In some embodiments, the base 200 is polygonal and has a first concave portion 216 at a corner of the base 200 and concaving from the first main body 210 to the −Z direction. A first opening 211 may be formed on the first main body 210, a second opening 212 may be formed on the first concave portion 216, and the sizes of the first opening 211 and the second opening 212 may be different.

In some embodiments, the block wall 230 may be plate-shaped, and the normal vector of the block wall 230 may be parallel to the first direction (e.g. the X direction). Moreover, the block wall 230 may include a first column 231 and a second column 232 extending in the first direction (e.g. the X direction). In some embodiments, the block wall 230 may further include a third opening 213, and the first main body 210 may include a fourth opening 214 and a fifth opening 215 at different sides of the first main body 210. The guiding element 800 may penetrate the fourth opening 214 and the fifth opening 215 to connect the base 200, and affixed on the base 200.

Figure 3:
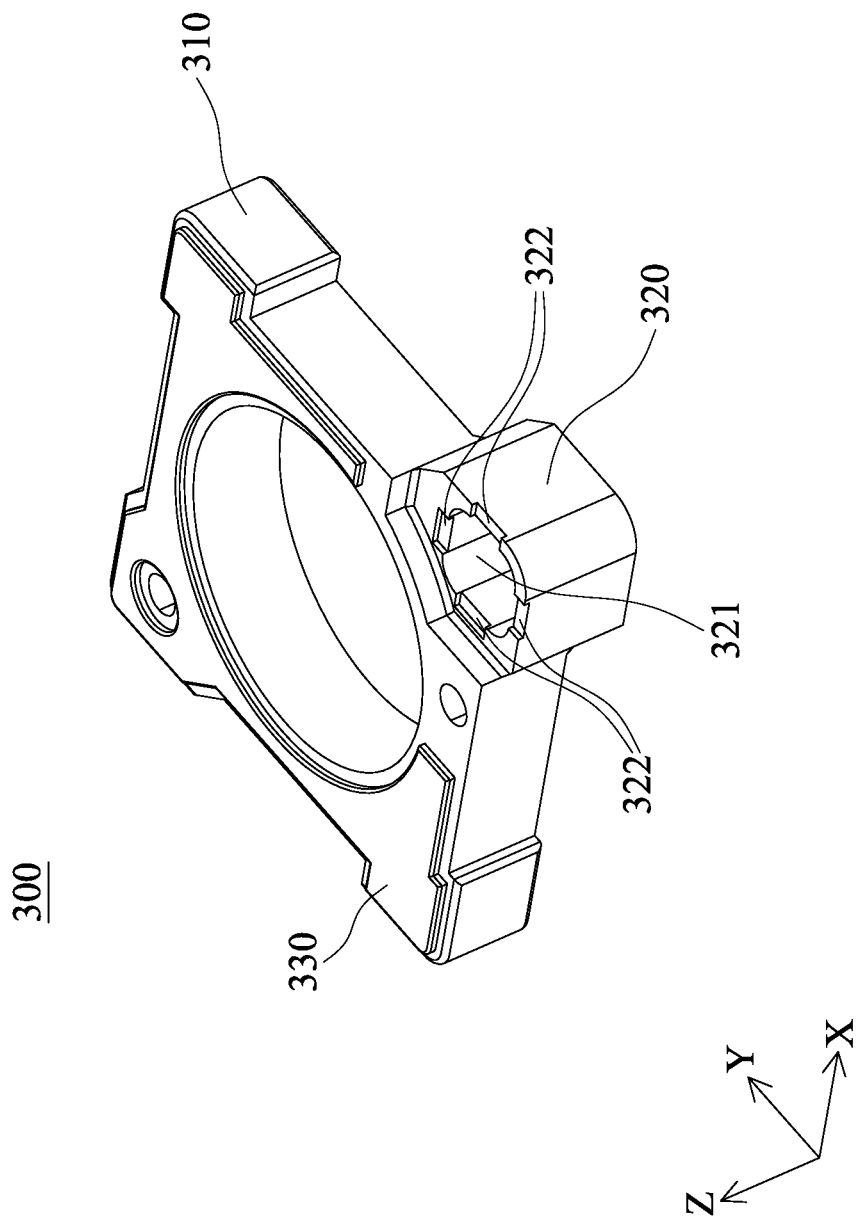
FIG. 3 is a schematic view of the movable portion.

FIG. 3 is a schematic view of the movable portion 300. The movable portion 300 may mainly include a second main body 310 and a disposing portion 320 position at a corner of the movable portion 300. The movable portion 300 is polygonal when viewed along the main axis 900. The disposing portion 320 may concave and extend from the second main body 310 in the −Z direction. Moreover, a through hole 321 and a plurality of second concave portion 322 may be formed on the disposing portion 320. The second concave portion 322 may be adjacent to the through hole 321. For example, the second concave portion 322 may arrange at four sides of the through hole 321 when viewed along the main axis 900. Moreover, a stopping portion 330 may be formed on the second main body 310, such as protrude from the second main body 310 to the Z direction.

Figure 4:
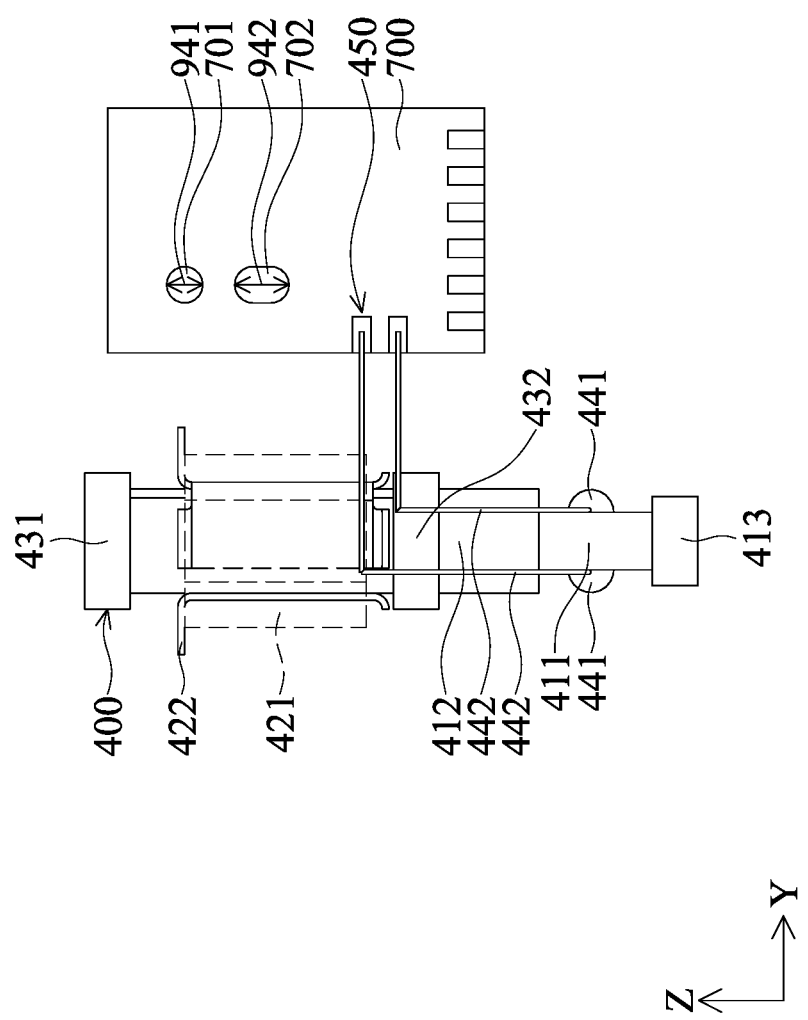
FIG. 4 is a schematic view of some elements of the optical element driving mechanism.

FIG. 4 is a schematic view of some elements of the optical element driving mechanism 1000, wherein the driving assembly 400 and the circuit element 700 are mainly shown in FIG. 4. As shown in FIG. 4, the driving assembly 400 may include a driving element 411, a transmission element 412, and a second weighting element 413. The driving element 411 may be strip-shaped and extend in the direction that the main axis 900 extends. The transmission element 412 and the second weighting element 413 may connect to the driving element 411 and disposed on opposite ends of the driving element 411.

In some embodiments, the material of the driving element 411 may include piezoelectric material. When an electric field (voltage) is applied to the surface of the piezoelectric material, the electric dipole moment will be elongated due to the action of the electric field. In order to resist the change, the piezoelectric material will elongate in the direction of the electric field, so mechanical deformation will occur. As a result, the transmission element 412 may be driven to move. For example, the electric dipole moment of the driving element 411 may be designed to extend in the Z direction, so the transmission element 412 may be driven to move in the Z direction. The density of the second weighting element 413 may be greater than the density of the transmission element 412 to resist reaction force when the driving element 411 is operating. In some embodiments, the material of the transmission element 412 may include carbon fiber, and the material of the second weighting element 413 may include metal.

In some embodiments, a first buffer element 431 and a second buffer element 432 may be disposed on the transmission element 412 to surround the transmission element 412. In some embodiments, the material of the first buffer element 431 and the second buffer element 432 may include elastic material, such as silicon gel. In some embodiments, the first buffer element 431 and the second buffer element 432 may movably connect to the transmission element 412 by friction to define the position of the transmission element 412.

In some embodiments, the transmission element 412 may be disposed in the first resilient element 421 and the second resilient element 422. In particular, the transmission element 412 may be disposed in the second resilient element 422, and the second resilient element 422 may be disposed in the first resilient element 421 and partially exposed from the first resilient element 421. In some embodiments, the first resilient element 421 and the second resilient element 422 may include different materials. For example, the first resilient element 421 may include soft material, and the second resilient element 422 may include metal material. The first resilient element 421 and the second resilient element 422 may movably connect to the transmission element 412 by friction to define the position of the transmission element 412.

In some embodiments, the driving element 411 may electrically connect to the circuit element 700 through a connecting element 441 and a conductive element 442. The connecting element 441 may be disposed on the driving element 411, and the connecting element 441 may be elements that can perform electrical connection, such as a solder ball. The conductive element 442 may connected to the connecting element 441 and a connecting point 450 of the circuit element 700. Therefore, electrical signal may be provided from the circuit element 700 to the driving element 411 to control the driving element 411.

In some embodiments, a first circuit element opening 701 and a second circuit element opening 702 may be formed on the circuit element 700 and arrange in the third direction (the Z direction). Furthermore, the sizes of the first circuit element opening 701 and the second circuit element opening 702 in the third direction may be different. For example, in the Z direction, the first circuit element opening 701 has a size 941, the second circuit element opening 702 has a size 942, and the size 941 and the size 942 are different, such as the size 941 may be less than the size 942. In other words, the second circuit element opening 702 may be strip-shaped and extend in the third direction. In some embodiments, the first circuit element opening 701 and the second circuit element opening 702 may be away from the center of the circuit element 700 to allow the wiring be easily design.

FIG. 5A, FIG. 5B, FIG. 5C, and FIG. 5D are perspective views of the optical element driving mechanism 1000. As shown in FIG. 5A to FIG. 5D, the first weighting element 500 may include a first weighting unit 520 and a first weighting connecting portion 531 and a second weighting connecting portion 532 extending from the first weighting unit 520. For example, the first weighting connecting portion 531 may extend in the first direction (the X direction), and the second weighting connecting portion 532 may extend in the second direction (the Y direction). The first weighting connecting portion 531 may be disposed in the first recess 223, and the second weighting connecting portion 532 may be disposed in the second recess 224. Glue may be provided between the first weighting element 500 and the first extending portion 220 to fix the position of the first weighting element 500 relative to the first extending portion 220. When viewed from the first direction or the second direction, the first weighting connecting portion 531 and the second weighting connecting portion 532 do not overlap each other to reduce the size in the first direction or the second direction, so miniaturization may be achieved.

The first weighting element 500 may be disposed on the driving assembly 400 to further stabilize the driving assembly 400. For example, the first weighting element 500 may be disposed on a bottom surface of the second weighting element 413, and adhesive elements such as glue may be provided between the first weighting element 500 and the second weighting element 413 to fix the position of the first weighting element 500 relative to the second weighting element 413. In some embodiments, the densities of the first weighting element 500 and the second weighting element 413 may be different, such as the materials of the first weighting element 500 and the second weighting element 413 may be different. Moreover, the densities of the first weighting element 500 and the second weighting element 413 may be higher than the density of the base 200. The first weighting element 500 and the second weighting element 413 may be disposed on opposite ends of the driving element 411 to fight against the reaction force of the driving element 411, so the driving assembly 400 may be stabilized, the energy consumption may be reduced, and the optical element driving mechanism 1000 may therefore has better performance, such as the speed of the movable portion 300 relative to the fixed portion 910 may be increased. For example, the density of the first weighting element 500 may be between about 5 g/cm$^3$ to about 20 g/cm$^3$.

In some embodiments, when viewed along the first direction and the second direction, the case 100 may at least partially overlap the first weighting element 500 and the first concave portion 216, and adhesive element such as glue may be disposed on overlapping portions to affix the positions of the case 100, the base 200, and the first weighting element 500. For example, the first main body 210 may be connected to the case 100 and at least partially overlap the side wall 120. In some embodiments, the first main body 210 may have a thickness 921, the first concave portion 216 may have a thickness 922, and the thickness 922 may be lower than the thickness 921. The transmission element 412 may space apart from the first opening 211 and penetrate the second opening 212 (FIG. 2).

Figure 5A:
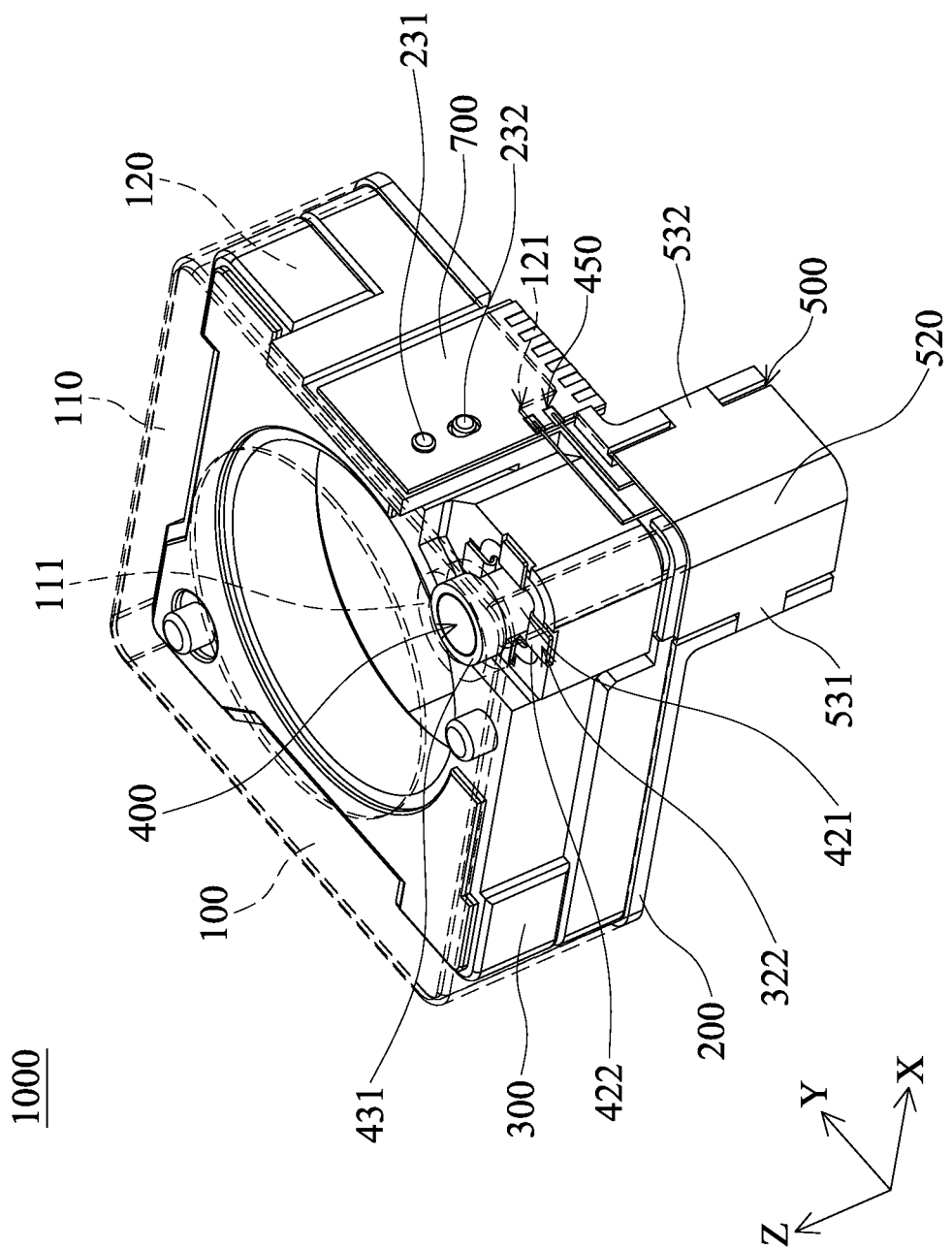
FIG. 5A, FIG. 5B, FIG. 5C, and FIG. 5D are perspective views of the optical element driving mechanism.
Figure 5B:
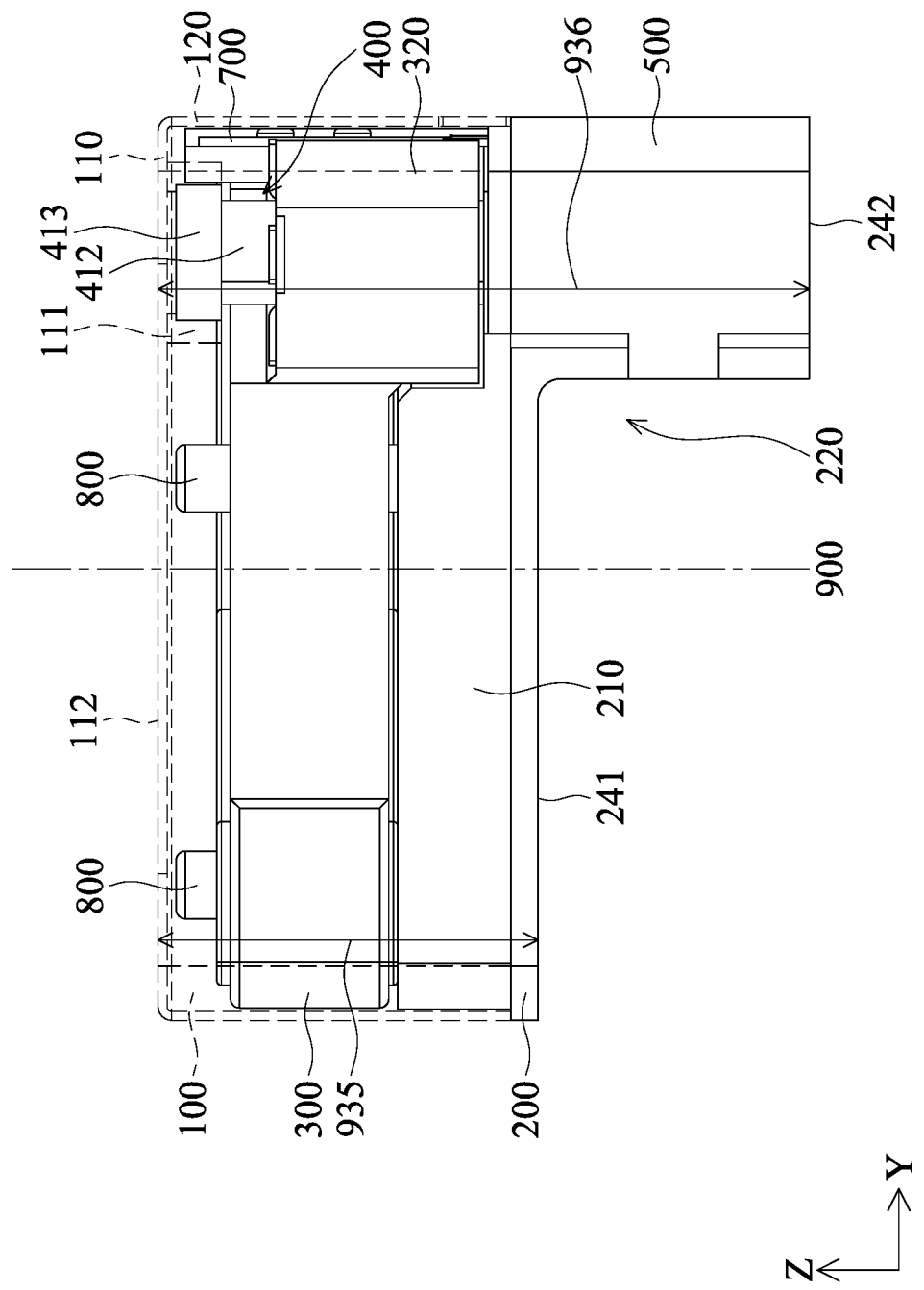
Figure 5C:
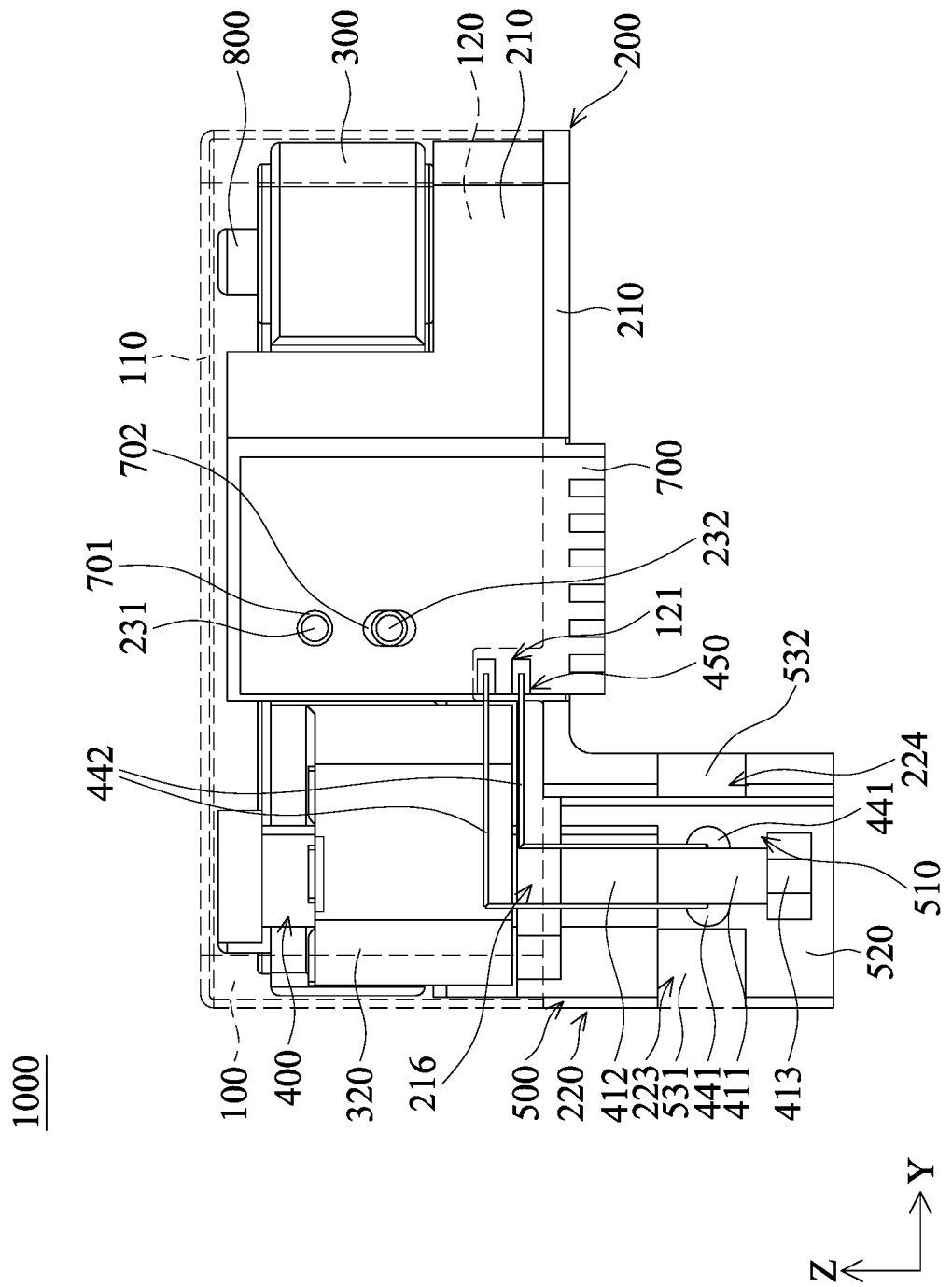
Figure 5D:
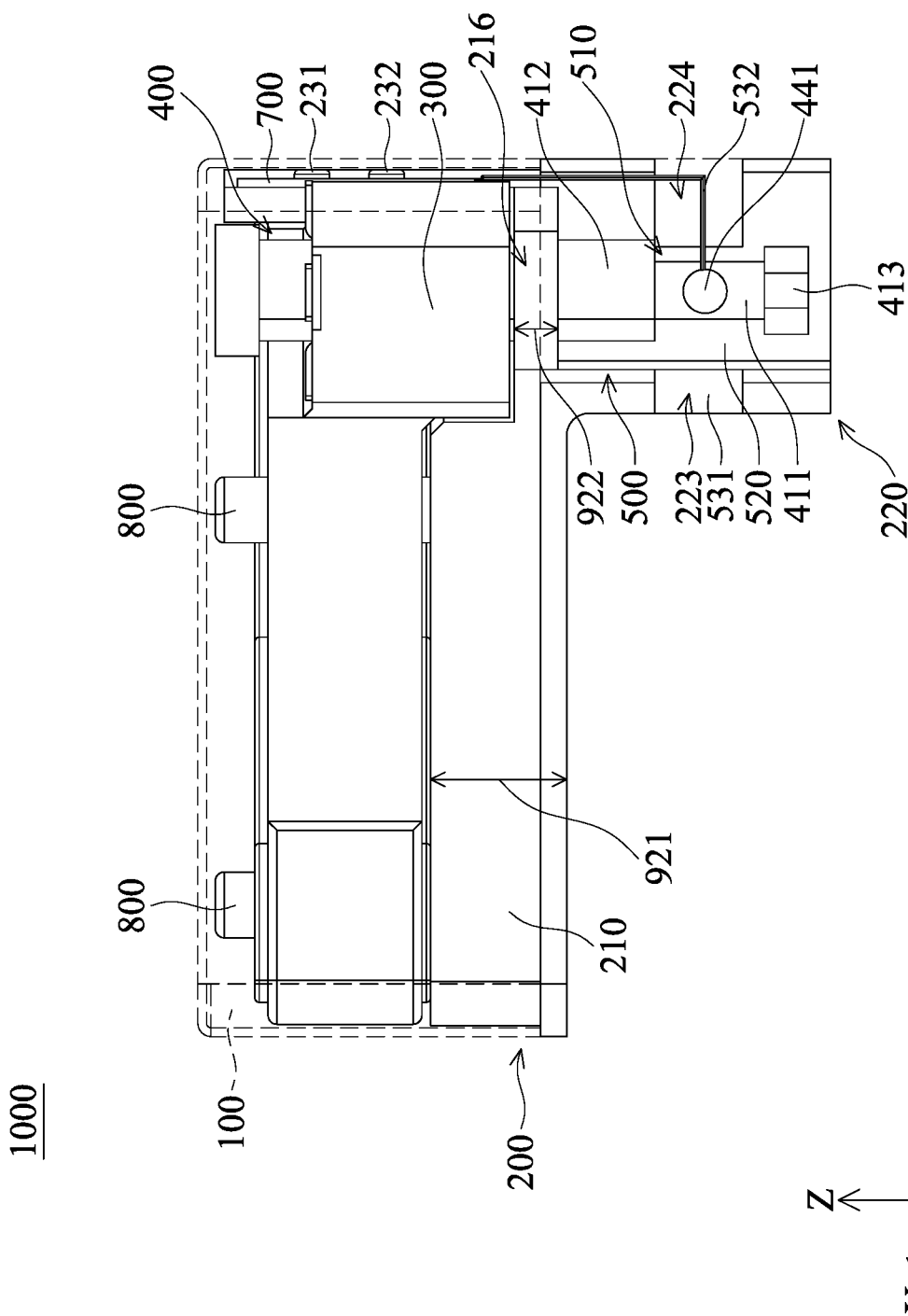

In some embodiments, the space 510 is formed between the first extending portion 220, the first weighting element 500, and the first concave portion 216 to accommodating a portion of the driving assembly 400, such as may accommodate the driving element 411, the second weighting element 413, and a portion of the transmission element 412. In some embodiments, as shown in FIG. 5B, the top wall 110 includes a top surface 112, the first main body 210 includes a first bottom surface 241, and the first extending portion 220 includes a second bottom surface 242. In the third direction, a distance 935 is between the top surface 112 and the first bottom surface 241, a distance 936 is between the top surface 112 and the second bottom surface 242, and the distance 935 is less than the distance 936. Therefore, the driving assembly 400 may be disposed in a larger space to increase the movable range of the movable portion 300 relative to the fixed portion 910.

In some embodiments, in the direction that the main axis 900 extends (the Z direction), at least a portion of the disposing portion 320 and the first concave portion 216 at last partially overlap each other, so the disposing portion 320 may be accommodating in the first concave portion 216. For example, as shown in FIG. 1D, in the direction that the main axis 900 extends, a distance 931 between the first main body 210 and the first bottom surface 241 may be greater than the distance 932 between the disposing portion 320 and the first bottom surface 241, so the movable range of the movable portion 300 relative to the fixed portion 910 may be increased. Furthermore, in the third direction, at least a portion of the disposing portion 320 overlaps the case extending portion 111, and a distance 933 between the stopping portion 330 and the top wall 110 may be less than a distance 934 between the disposing portion 320 and the case extending portion 111. Therefore, when the movable portion 300 moves relative to the fixed portion 910 in the Z direction, the movable portion 300 may be in direct contact with the case 100 through the stopping portion 330, and the disposing portion 320 does not in contact with the case 100 to protect the disposing portion 320.

Moreover, as shown in FIG. 1D, the first buffer element 431 and the second buffer element 432 may be disposed between the fixed portion 910 (e.g. the case 100 or the base 200) and the second opening 212 to absorb excess vibration. For example, the second buffer element 432 may be disposed between the first concave portion 216 and the transmission element 412. In some embodiments, in the direction that the main axis 900 extends, at least a portion of the first buffer element 431 may overlap the second buffer element 432 to achieve miniaturization.

Furthermore, the first resilient element 421 and the second resilient element 422 may be disposed between the movable portion 300 and the transmission element 412, such as may be disposed in the through hole 321 to act as a power source of the movable portion 300, and the transmission element 412 may be stabilized by the first resilient element 421 and the second resilient element 422. In some embodiments, as shown in FIG. 5A, a portion of the second resilient element 422 may be disposed in the second concave portion 322 to further fix the position of the second resilient element 422. In some embodiments, at least a portion of the first resilient element 421 may overlap the second resilient element 422 in the direction that the main axis 900 extends to achieve miniaturization.

In some embodiments, the case 100 may include a top wall 110 and a side wall 120 extending from an edge of the top wall 110. The normal vector of the top wall 110 may be substantially parallel to the main axis 900. A case extending portion 111 may be formed on the top wall 110 and extending from the top wall 110 in the direction that the main axis 900 extends (i.e. the −Z direction). The case extending portion 111 may surround the first buffer element 431. In particular, the first buffer element 431 may be disposed between the case extending portion 111 and the transmission element 412.

In some embodiments, the circuit element 700 may be disposed on the fixed portion 910, such as may be disposed on the block wall 230 of the base 200. The first column 231 penetrates the first circuit element opening 701, and the second column 232 penetrates the second circuit element opening 702 to fix the position of the circuit element 700 relative to the block wall 230. Moreover, since the second circuit element opening 702 is strip-shaped, the tolerance between the first column 231 and the second column 232 may be allowed to happen, and the circuit element 700 may be ensured to be disposed on the block wall 230.

A side wall recess 121 may be formed on the side wall 120. When viewed in the first direction, the connecting point 450 is exposed from the side wall recess 121 to dispose additional connecting element (e.g. solder ball) at the connecting point 450 easily. When viewed in the first direction, the first circuit element opening 701 and the second circuit element opening 702 overlaps the side wall 120 to protect the first circuit element opening 701 and the second circuit element opening 702.

Figure 6A:
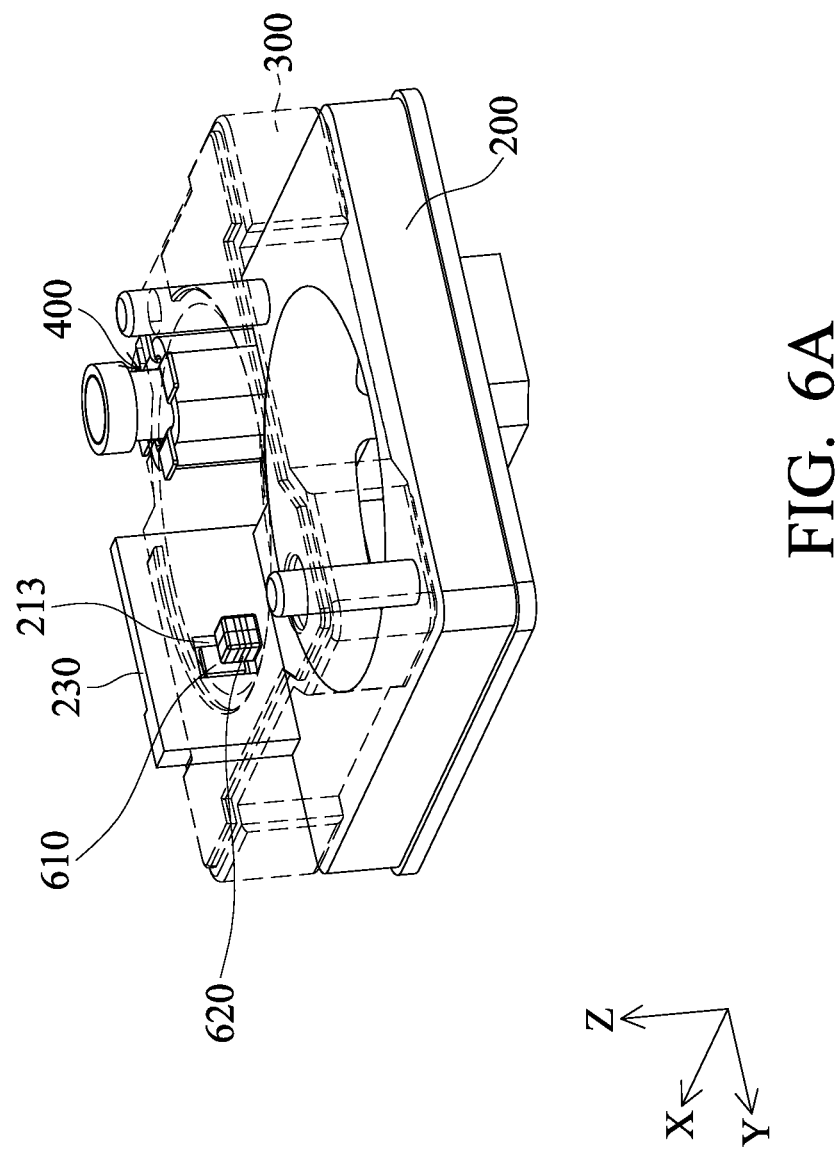
FIG. 6A and FIG. 6B are schematic views of some elements of the optical element driving mechanism.
Figure 6B:
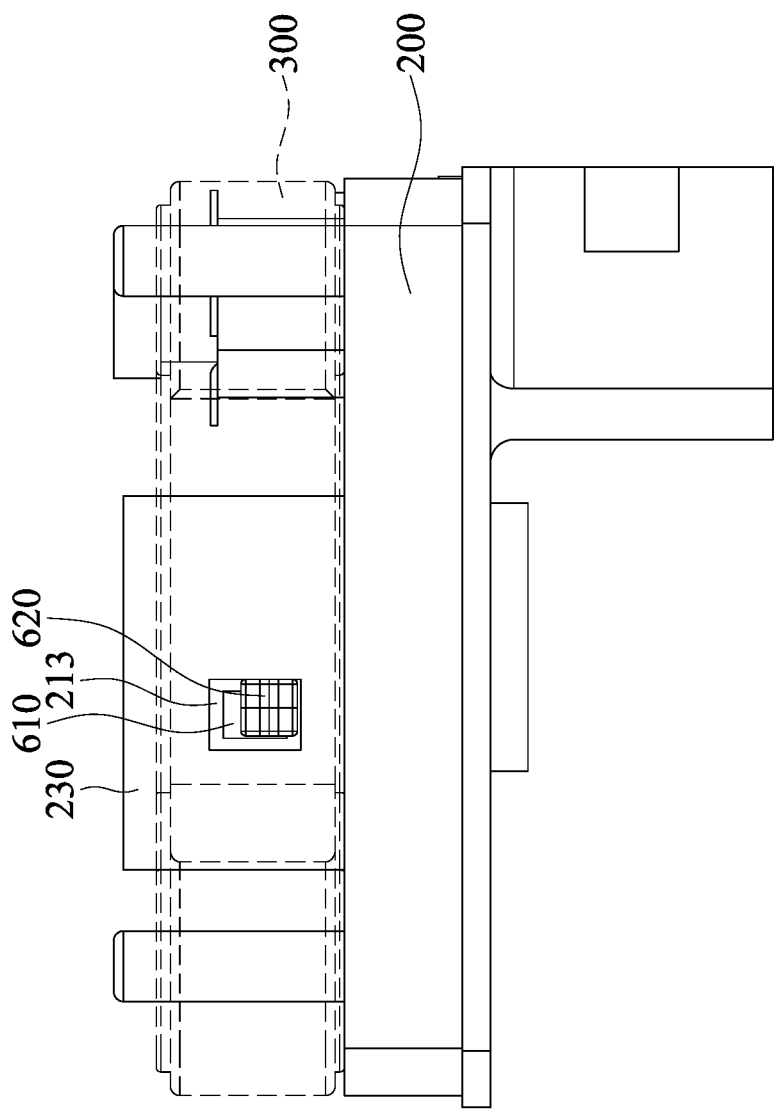

FIG. 6A and FIG. 6B are schematic views of some elements of the optical element driving mechanism 1000, wherein the configuration between the sensing element 610 and the magnetic element 620 are mainly shown. As shown in FIG. 6A and FIG. 6B, in the first direction, at least a portion of the sensing element 610 overlaps the magnetic element 620. Moreover, the sensing element 610 may be disposed in the third opening 213 to protect the sensing element 610. In some embodiments, the third opening 213 may be replaced by a recess, depending on design requirement.

Figure 7A:
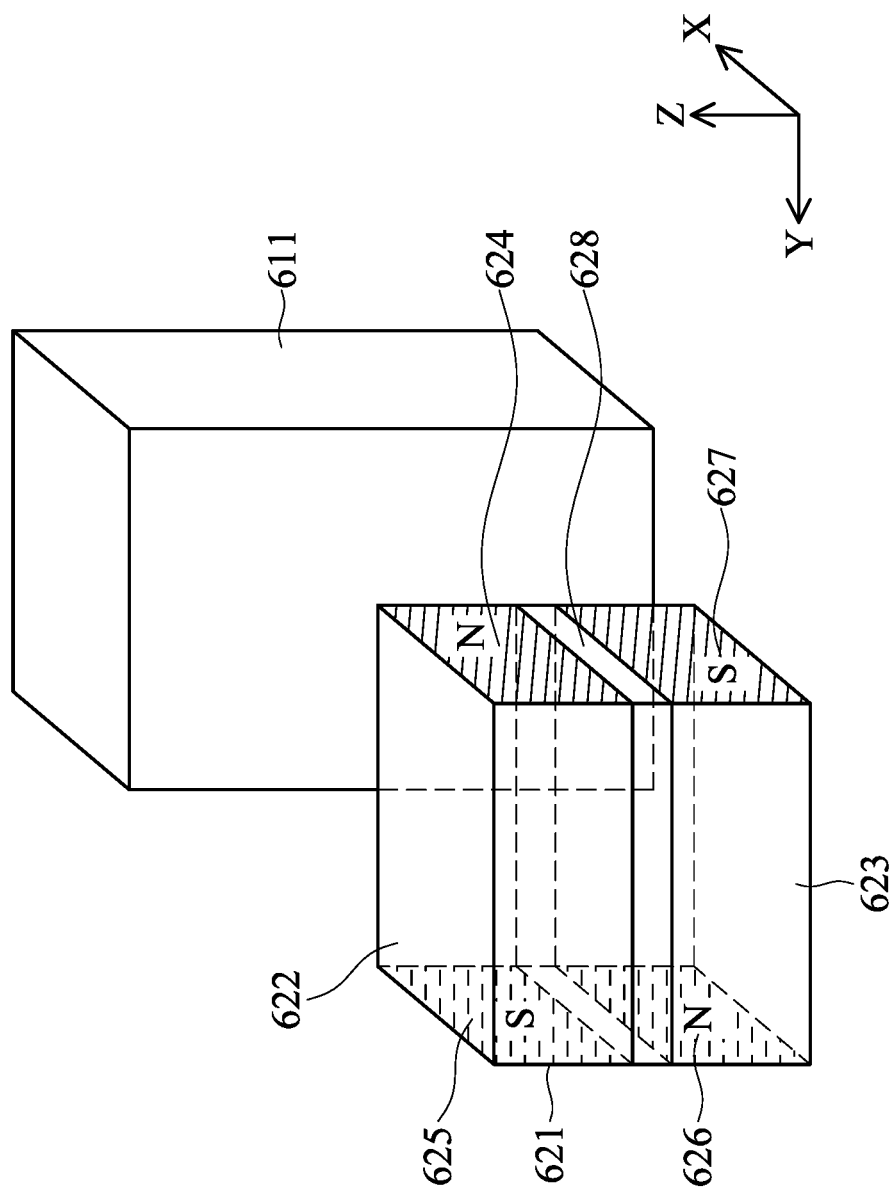
FIG. 7A is a schematic view of a sensing element and a magnetic element.

FIG. 7A is a schematic view of a sensing element 611 and a magnetic element 621. The sensing element 611 and the magnetic element 621 may be disposed on the positions of the sensing element 610 and the magnetic element 620 in the optical element driving mechanism 1000, and other elements of the optical element driving mechanism 1000 are omitted in FIG. 7A for clarity. In some embodiments, as shown in FIG. 7A, the sensing element 611 and the magnetic element 621 are arranged in the first direction, and the magnetic element 621 may include a first magnetic unit 622, second magnetic unit 623, and magnetic-free region 628. In some embodiments, the first magnetic unit 622 and the second magnetic unit 623 may be magnets, and the first magnetic unit 622 and the second magnetic unit 623 may be arranged in the third direction (the Z direction), and the magnetic-free region 628 may be disposed between the first magnetic unit 622 and the second magnetic unit 623 to prevent interference between the first magnetic unit 622 and the second magnetic unit 623.

The first magnetic unit 622 may include a first pole 624 and a second pole 625 arrange in the second direction. The first pole 624 and the second pole 625 may be the N pole and the S pole of a magnet, respectively, and their polarity may be interchanged, depending on design requirement. The second magnetic unit 623 may include a third pole 626 and a fourth pole 627 arrange in the second direction. The third pole 626 and the fourth pole 627 may be the N pole and the S pole of a magnet, respectively, and their polarity may be interchanged, depending on design requirement. Moreover, the polarity of the first pole 624 and the third pole 626 may be identical, and the polarity of the second pole 625 and the fourth pole 627 may be identical.

It should be noted that in such embodiment, the sensing element 611 and the magnetic element 621 are arrange in the first direction (e.g. the X direction), the first pole 624 and the second pole 625 (or the third pole 626 and the fourth pole 627) are arranged in the second direction (e.g. the Y direction), and the magnetic element 621 moves relative to the sensing element 611 in the third direction (e.g. the Z direction), and the three directions are different. In such situation, the sensing element 611 may be a sensor that can detect angle, such as a TMR sensor. Therefore, the sensitivity of detection may be enhanced.

Figure 7B:
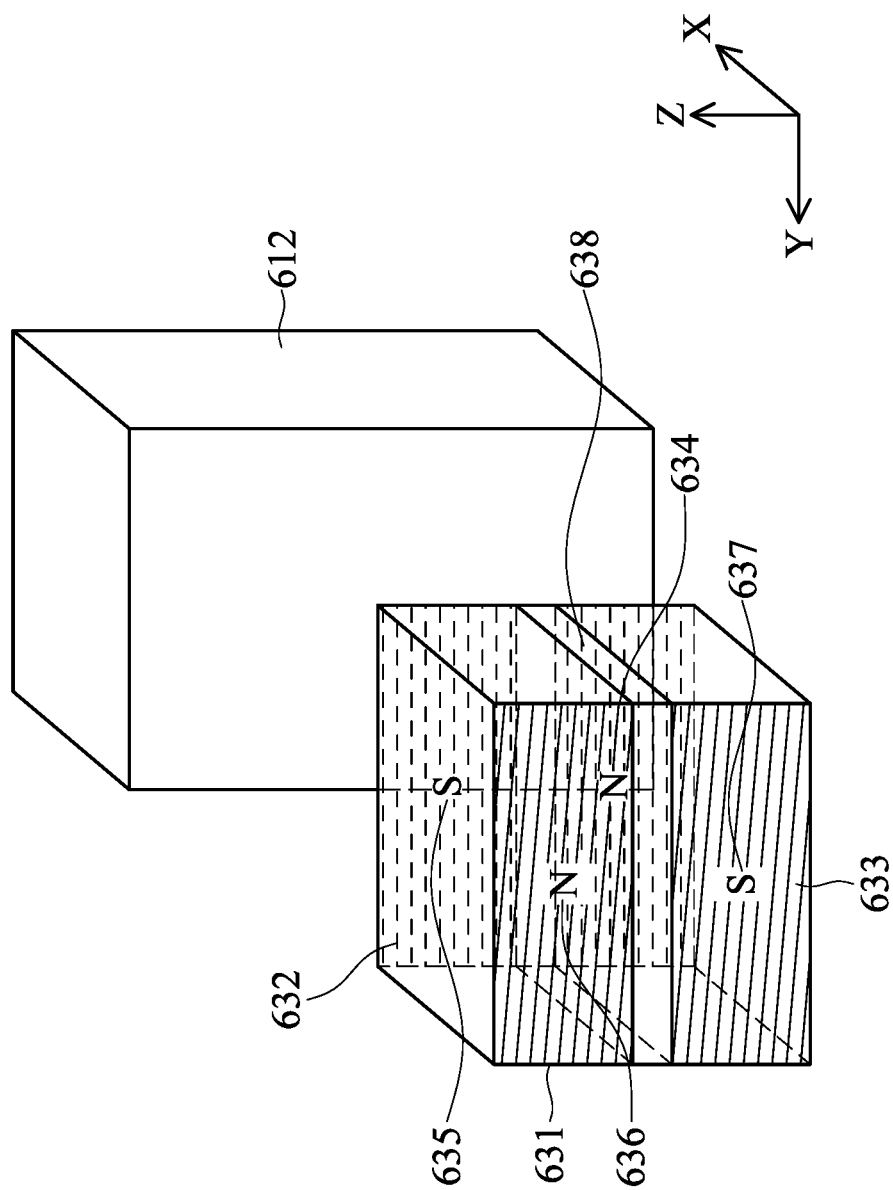
FIG. 7B is a schematic view of a sensing element and a magnetic element.

FIG. 7B is a schematic view of a sensing element 612 and a magnetic element 631. The sensing element 612 and the magnetic element 631 may be disposed on the positions of the sensing element 610 and the magnetic element 620 in the optical element driving mechanism 1000, and other elements of the optical element driving mechanism 1000 are omitted in FIG. 7B for clarity. In some embodiments, as shown in FIG. 7B, the sensing element 612 and the magnetic element 631 are arranged in the first direction, and the magnetic element 631 may include a first magnetic unit 632, second magnetic unit 633, and magnetic-free region 638. In some embodiments, the first magnetic unit 632 and the second magnetic unit 633 may be magnets, and the first magnetic unit 632 and the second magnetic unit 633 may be arranged in the third direction (the Z direction), and the magnetic-free region 638 may be disposed between the first magnetic unit 632 and the second magnetic unit 633 to prevent interference between the first magnetic unit 632 and the second magnetic unit 633.

The first magnetic unit 632 may include a first pole 634 and a second pole 635 arrange in the first direction. The first pole 634 and the second pole 635 may be the N pole and the S pole of a magnet, respectively, and their polarity may be interchanged, depending on design requirement. The second magnetic unit 633 may include a third pole 636 and a fourth pole 637 arrange in the first direction. The third pole 636 and the fourth pole 637 may be the N pole and the S pole of a magnet, respectively, and their polarity may be interchanged, depending on design requirement. Moreover, the polarity of the first pole 634 and the third pole 636 may be identical, and the polarity of the second pole 635 and the fourth pole 637 may be identical.

It should be noted that in such embodiment, the sensing element 612 and the magnetic element 631 are arrange in the first direction (e.g. the X direction), the first pole 634 and the second pole 635 (or the third pole 636 and the fourth pole 637) are arranged in the first direction (e.g. the X direction), and the magnetic element 631 moves relative to the sensing element 612 in the third direction (e.g. the Z direction). In other words, the sensing element 612 and the magnetic element 631 are arranged in a direction identical to the direction that the first pole 634 and the second pole 635 (or the third pole 636 and the fourth pole 637) arranged. In such situation, the sensing element 612 may be a sensor that can detect linear movement, such as a Hall sensor.

Figure 7C:
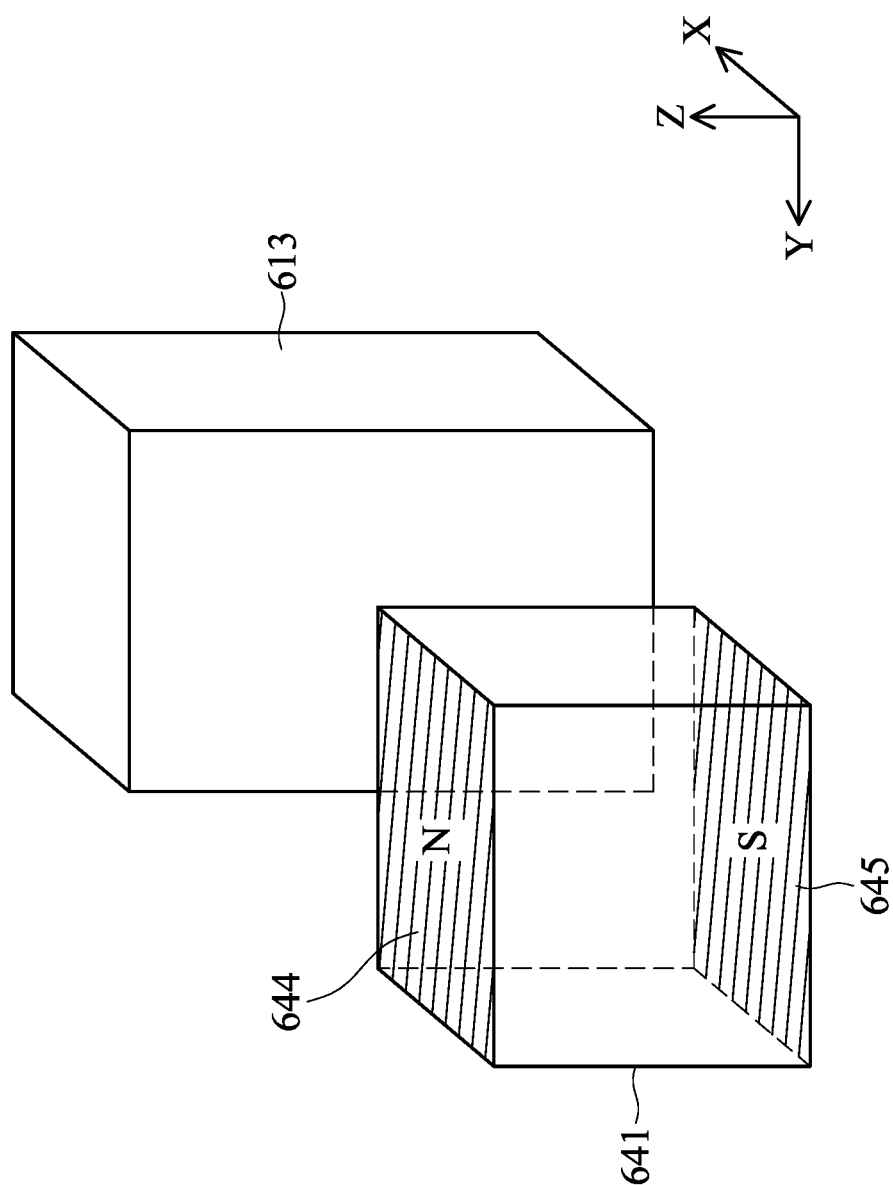
FIG. 7C is a schematic view of a sensing element and a magnetic element.

FIG. 7C is a schematic view of a sensing element 613 and a magnetic element 641. The sensing element 613 and the magnetic element 641 may be disposed on the positions of the sensing element 610 and the magnetic element 620 in the optical element driving mechanism 1000, and other elements of the optical element driving mechanism 1000 are omitted in FIG. 7C for clarity. In some embodiments, as shown in FIG. 7C, the sensing element 613 and the magnetic element 641 are arranged in the first direction, and the magnetic element 641 may include a first pole 644 and a second pole 645 arranged in the third direction. It should be noted that in such embodiment, the sensing element 613 and the magnetic element 641 are arrange in the first direction (e.g. the X direction), the first pole 644 and the second pole 645 are arranged in the third direction (e.g. the Z direction), and the magnetic element 641 moves relative to the sensing element 613 in the third direction (e.g. the Z direction). In other words, the sensing element 613 and the magnetic element 641 are arranged in a direction identical to the direction that the first pole 644 and the second pole 645 arranged. In such situation, the sensing element 613 may be a sensor that can detect linear movement, such as a Hall sensor.

In summary, an optical element driving mechanism is provided. The optical element driving mechanism includes a fixed portion, a movable portion, a driving assembly, and a first weighting element. The movable portion is arranged with the fixed portion in a main axis, and the movable portion is movable relative to the fixed portion. The driving assembly is used for driving the movable portion to move relative to the fixed portion. The first weighting element is disposed on the driving assembly for stabilizing the driving assembly. Therefore, the stroke of the movable portion relative to the fixed portion may become greater. The accuracy of sensing may be higher, and miniaturization may be achieved.

The relative positions and size relationship of the elements in the present disclosure may allow the driving mechanism achieving miniaturization in specific directions or for the entire mechanism. Moreover, different optical modules may be combined with the driving mechanism to further enhance optical quality, such as the quality of photographing or accuracy of depth detection. Therefore, the optical modules may be further utilized to achieve multiple anti-vibration systems, so image stabilization may be significantly improved.

Although embodiments of the present disclosure and their advantages already have been described in detail, it should be understood that various changes, substitutions and alterations may be made herein without departing from the spirit and the scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are also intended to include within their scope of such processes, machines, manufacture, and compositions of matter, means, methods, or steps. In addition, each claim herein constitutes a separate embodiment, and the combination of various claims and embodiments are also within the scope of the disclosure.

What is claimed is:

1. An optical element driving mechanism, comprising:
    a fixed portion comprising a first extending portion extending in a main axis, wherein the first extending portion comprises a first extending unit and a second extending unit being plate-shaped, a first recess is formed on the first extending unit, and a second recess is formed on the second extending unit;
    a movable portion arranged with the fixed portion in the main axis, and the movable portion is movable relative to the fixed portion;
    a driving assembly used for driving the movable portion to move relative to the fixed portion; and
    a first weighting element disposed on the driving assembly for stabilizing the driving assembly.

2. The optical element driving mechanism as claimed in claim 1, wherein the fixed portion further comprises:
    a case; and
    a bottom arranged with the case along the main axis, wherein the bottom comprises:
        a first main body connecting to the case;
    wherein the first extending portion extends from the first main body along the main axis.

3. The optical element driving mechanism as claimed in claim 2, wherein:
    the first weighting element comprises a first weighting unit, a first weighting connecting portion, and a second weighting connecting portion;
    the first weighting connecting portion extends from the first weighting unit in a first direction;
    the second weighting connecting portion extends from the first weighting unit in a second direction; and
    the first direction and the second direction are different.

4. The optical element driving mechanism as claimed in claim 3, wherein:
    the first weighting connecting portion is disposed in the first recess;
    the second weighting connecting portion is disposed in the second recess;
    a normal vector of the first extending unit is parallel to the first direction;
    a normal vector of the second extending unit is parallel to the second direction;
    when viewed along the first direction, the first weighting connecting portion does not overlap the second weighting connecting portion; and
    when viewed along the second direction, the first weighting connecting portion does not overlap the second weighting connecting portion.

5. The optical element driving mechanism as claimed in claim 4, wherein the driving assembly comprises:
    a driving element;
    a second weighting element connecting to the driving element; and
    a transmission element connecting to the driving element and is strip-shaped;
    wherein:
    the second weighting element is disposed on the first weighting element;
    the density of the first weighting element is different from the density of the second weighting element;
    the material of the first weighting element is different from the material of the bottom;
    the material of the second weighting element is different from the material of the bottom;
    the density of the first weighting element is greater than the density of the bottom; and
    the density of the second weighting element is greater than the density of the bottom.

6. The optical element driving mechanism as claimed in claim 5, wherein:
    the first weighting element and the transmission element are disposed on opposite sides of the driving element;
    the second weighting element and the transmission element are disposed on opposite sides of the driving element;
    the bottom further comprises a first concave portion concaving from the first main body;
    the bottom is polygonal when viewed along the main axis;
    the first concave portion is position at a corner of the bottom; and
    the thickness of the first concave portion is less than the thickness of the first main body.

7. The optical element driving mechanism as claimed in claim 6, wherein:
    a space is formed between the first extending portion, the first weighting element, and the first concave portion;
    the driving assembly is partially disposed in the space;
    a first opening is formed on the first main body;
    a second opening is formed on the first concave portion;
    the transmission element is spaced apart from the first opening; and
    the transmission element passes through the second opening.

8. The optical element driving mechanism as claimed in claim 7, wherein:
    the movable portion comprises a second main body and a disposing portion;
    when viewed along the main axis, the movable portion is polygonal;
    the disposing portion is at a corner of the movable portion; and at least a portion of the disposing portion overlaps the first concave portion in the direction that the main axis extends.

9. The optical element driving mechanism as claimed in claim 8, wherein:
the first main body comprises a bottom surface;
a distance between the second main body and the bottom surface is greater than a distance between the disposing portion and the bottom surface in the direction that the main axis extends;
the second weighting element is disposed in the space;
the driving element is disposed in the space;
a portion of the transmission element is disposed in the space;
a through hole and a second concave portion are formed on the disposing portion; and
the second concave portion is adjacent to the through hole.

10. The optical element driving mechanism as claimed in claim 9, further comprising:
a first buffer element disposed between the fixed portion and the transmission element;
a second buffer element disposed between the fixed portion and the transmission element;
a first resilient element disposed between the movable portion and the transmission element;
a second resilient element disposed between the movable portion and the transmission element; and
a guiding element disposed between the movable portion and the fixed portion and extending in the direction that the main axis extends, wherein the guiding element is used for limiting the moving direction of the movable portion relative to the fixed portion.

11. The optical element driving mechanism as claimed in claim 10, wherein the case comprises:
a top wall;
a side wall extending from the top wall in the direction that the main axis extends; and
a case extending portion extending from the top wall in the direction that the main axis extends.

12. The optical element driving mechanism as claimed in claim 11, wherein:
the case extending portion surrounds the first buffer element;
the first buffer element is disposed between the case extending portion and the transmission element;
the second buffer element is disposed between the first concave portion and the transmission element;
the second resilient element is disposed between the first resilient element and the transmission element; and
a portion of the second resilient element is exposed from the first resilient element.

13. The optical element driving mechanism as claimed in claim 12, wherein:
the first resilient element is disposed in the through hole;
the second resilient element is disposed in the through hole;
a portion of the second resilient element is disposed in the second concave portion;
at least a portion of the first buffer element overlaps the second buffer element in a direction that the transmission element extends; and
at least a portion of the first resilient element overlaps the second resilient element in the direction that the transmission element extends.

14. The optical element driving mechanism as claimed in claim 13, wherein the bottom further comprises a block wall disposed on the first main body;
the block wall is plate-shaped;
the block wall comprises a first column and a second column extending in the first direction;
the optical element driving mechanism further comprises a circuit element disposed on the fixed portion;
the circuit element comprises a first circuit element opening and a second circuit element opening;
the first column passes through the first circuit element opening;
the second column passes through the second circuit element opening;
the first circuit element opening and the second circuit element opening are arranged in a third direction; and
the third direction is parallel to the main axis.

15. The optical element driving mechanism as claimed in claim 14, wherein:
the second circuit element opening is strip-shaped and extends in the third direction;
the size of the first circuit element opening is different from the size of the second circuit element opening in the third direction;
the first circuit element opening and the second circuit element opening are formed away from the center of the circuit element;
the optical element driving mechanism further comprises a connecting element and a conductive element;
the conductive element is disposed on the driving element and electrically connected to the driving element; and
the conductive element connects to the connecting element and a connecting point of the circuit element.

16. The optical element driving mechanism as claimed in claim 15, wherein:
the side wall comprises a side wall recess;
the connecting point is exposed from the side wall recess when viewed along the first direction; and
the first circuit element opening and the second circuit element opening overlaps the side wall when viewed along the first direction.

17. The optical element driving mechanism as claimed in claim 16, further comprising a sensing assembly used for detecting the position of the movable portion relative to the fixed portion, wherein the sensing assembly comprises a sensing element and a magnetic element respectively disposed on the fixed portion and the movable portion, wherein:
at least a portion of the sensing element overlaps the magnetic element in the first direction;
the movable portion moves relative to the fixed portion in the third direction;
the first direction and the third direction are different;
the block wall comprises a third opening; and
the sensing element is disposed in the third opening.

18. The optical element driving mechanism as claimed in claim 17, wherein the magnetic element comprises:
a first magnetic unit;
a second magnetic unit arranged with the first magnetic unit in the third direction; and
a magnetic-free region disposed between the first magnetic unit and the second magnetic unit;
wherein:
the first magnetic unit comprises a first pole and a second pole arranged in the second direction;
the second magnetic unit comprises a third pole and a fourth pole arranged in the second direction;

the polarity of the first pole is identical to the polarity of the third pole;

the polarity of the second pole is identical to the polarity of the fourth pole; and the sensing element is used for detecting the magnetic field variation of the magnetic element in the first direction, the second direction, and the third direction.

19. The optical element driving mechanism as claimed in claim 17, wherein the magnetic element comprises:

a first magnetic unit;

a second magnetic unit arranged with the first magnetic unit in the third direction; and a magnetic-free region disposed between the first magnetic unit and the second magnetic unit;

wherein:

the first magnetic unit comprises a first pole and a second pole arranged in the first direction;

the second magnetic unit comprises a third pole and a fourth pole arranged in the first direction;

the polarity of the first pole is identical to the polarity of the third pole;

the polarity of the second pole is identical to the polarity of the fourth pole; and the sensing element is used for detecting the magnetic field variation of the magnetic element in the third direction.

20. The optical element driving mechanism as claimed in claim 17, wherein the magnetic element comprises a first pole and a second pole arranged in the third direction; and the sensing element is used for detecting the magnetic field variation of the magnetic element in the third direction.

* * * * *